Sept. 30, 1930.  J. A. HELLSTROM  1,777,263
UNIVERSAL JOINT
Filed Feb. 18, 1926   2 Sheets-Sheet 1
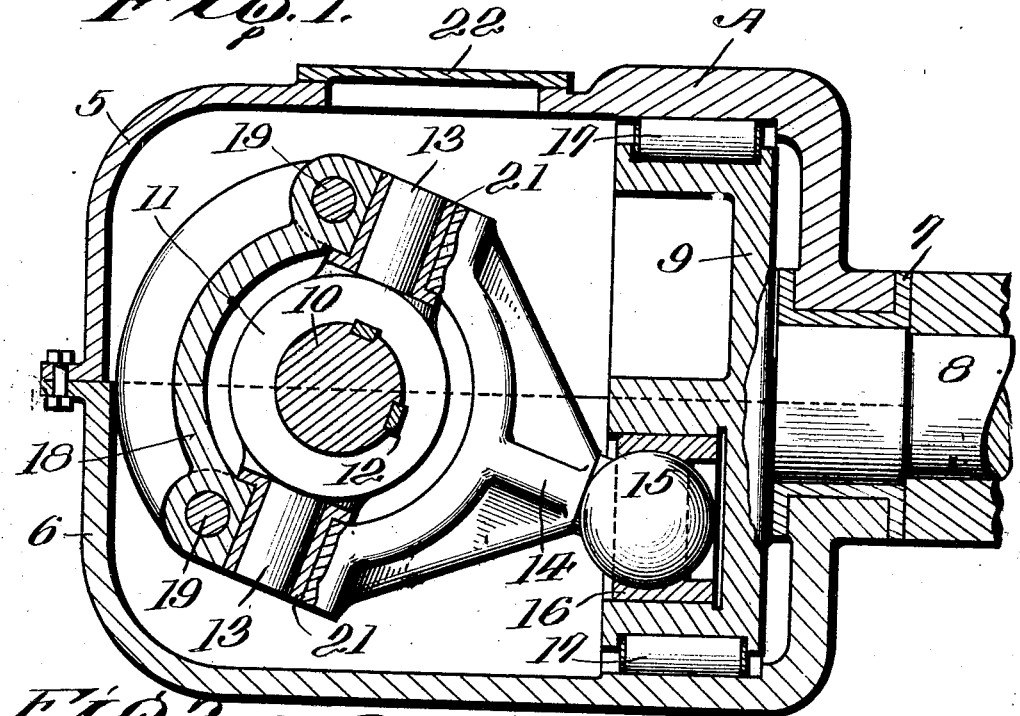
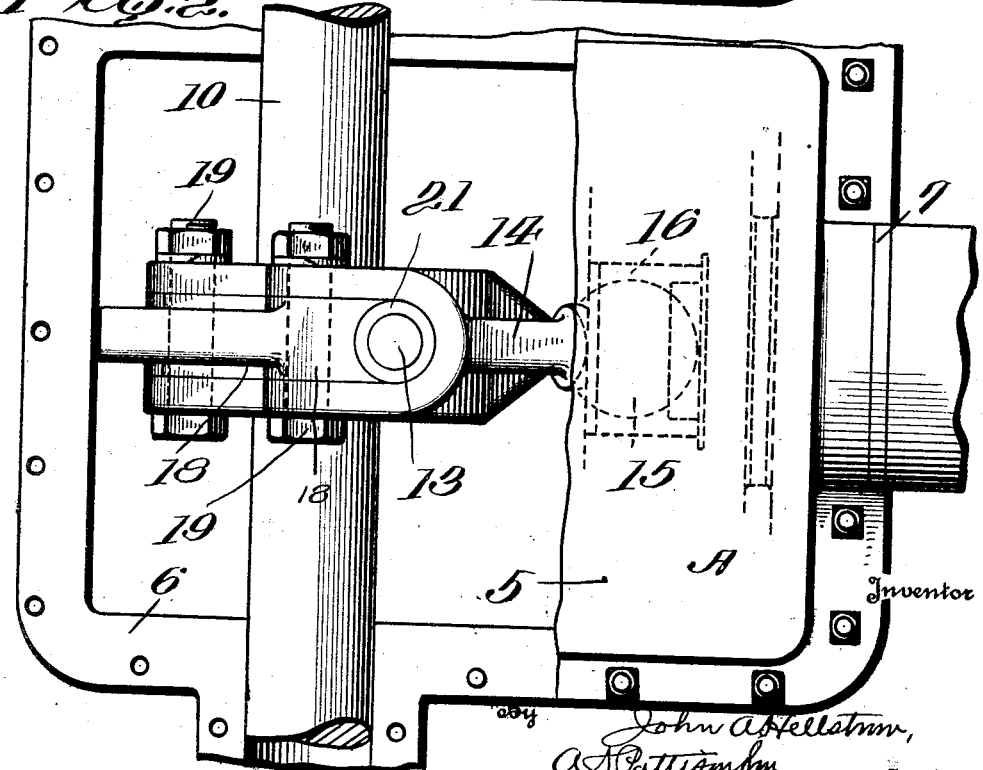

Sept. 30, 1930. J. A. HELLSTROM 1,777,263
UNIVERSAL JOINT
Filed Feb. 18, 1926 2 Sheets-Sheet 2

Inventor
John A. Hellstrom,
By A. S. Pattison
Attorney

Patented Sept. 30, 1930

1,777,263

UNITED STATES PATENT OFFICE

JOHN A. HELLSTROM, OF WOODLAWN, WHEELING, WEST VIRGINIA

UNIVERSAL JOINT

Original application filed February 27, 1925, Serial No. 12,001. Divided and this application filed February 18, 1926. Serial No. 89,108.

This invention relates to improvements in universal joints.

The present application is a division of my pending application Serial No. 12,001, filed February 27, 1925, entitled "Manipulator for rolling mills", wherein is disclosed one of the many uses to which a universal joint made in accordance with my invention can be utilized to great advantage for converting rotary motion to a rocking motion.

The primary object of the invention is the provision of a universal joint or machine element of a novel construction whereby a rocking motion is imparted to a shaft through the medium of a revolving shaft.

Further objects of the invention are the provision of a machine element of simple construction, cheap of manufacture, and which can be readily adapted for use where it is desired to impart a rocking or sliding motion to a shaft or other element through the medium of a revolving shaft.

Other objects, novel features of construction and improved results of the invention will appear from the following description and accompanying drawings.

In the drawings:

Figure 1 is a sectional view through the universal drive.

Figure 2 is a top plan view of Figure 1, the housing cover being broken away in part.

Figure 3:
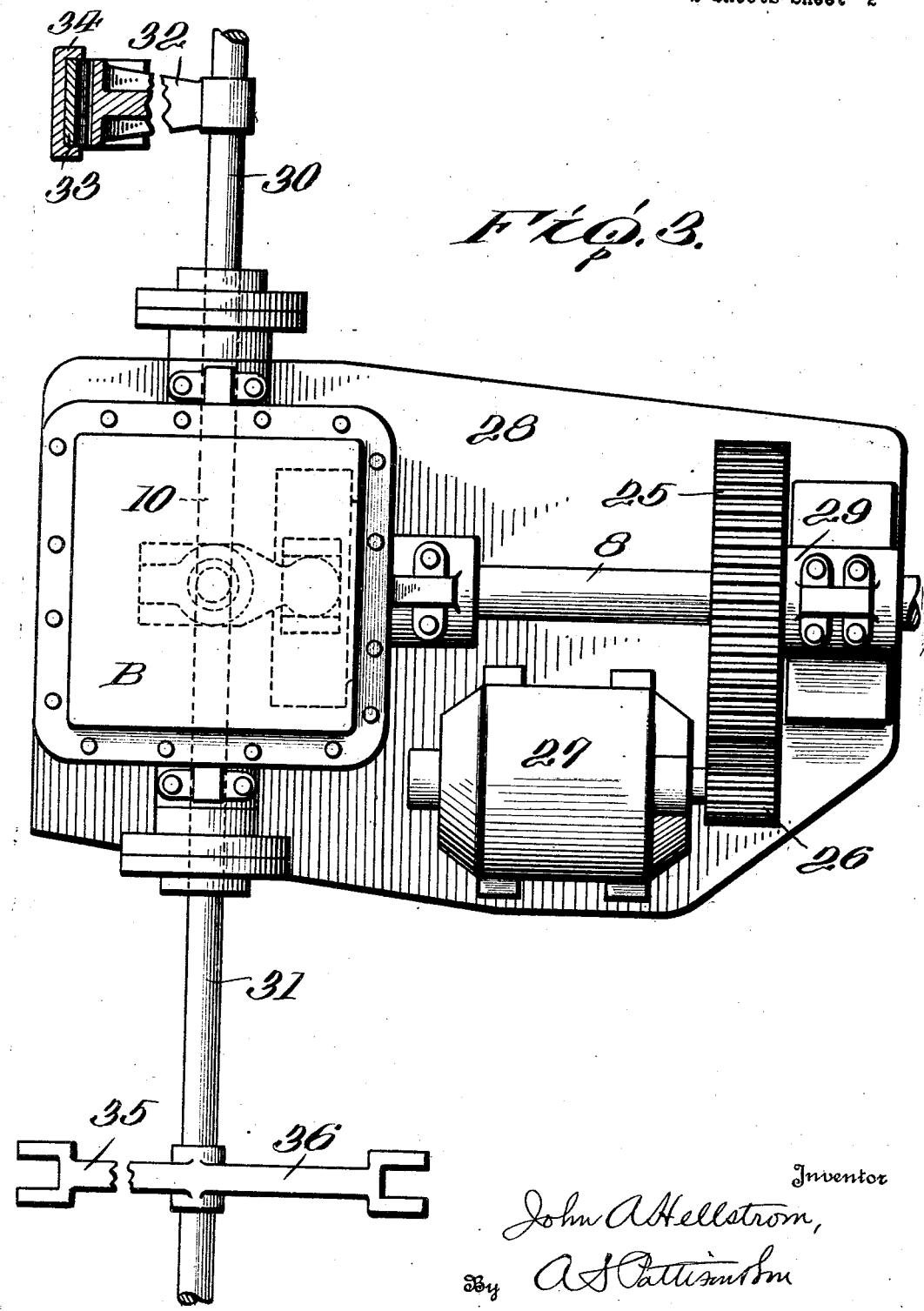
Figure 3 is a plan view showing a modification of the use of the universal drive.

Describing the invention in detail, reference being had to the accompanying drawings in which like parts are designated by similar reference numerals throughout the description, it will be seen that the universal drive is enclosed in a two-part housing A comprising a top portion 5 and a bottom portion 6. One end of the housing is reduced and constructed to receive a bearing 7 in which is rotatably supported the drive shaft 8 which is connected to a drive or suitable power source (not shown) and has connection with the wheel 9 of the universal drive.

Passing transversely through the housing A and positioned approximately intermediate its length is a shaft 10 which will be hereinafter referred to as the rocker shaft for the reason that the rotary motion of the drive shaft 8 is converted by reason of the universal drive to rock the shaft 10.

That portion of the shaft 10 within the universal drive housing carries a hub 11 keyed to the shaft as at 12 and provided with outwardly extending trunnions 13. A pitman 14 provided with a ball shaped end 15 engages the rotatable bearing 16 carried by the inner face of the wheel 9. The outer perimeter of the wheel 9 is supported on suitable roller bearings 17 positioned between the wheel and the housing parts 5 and 6. The outer end of the pitman is fork-shaped being provided with a yoke-portion 18 to permit the connection of the fork with the hub trunnions 13. The yoke-portion 18 is held in locked position by suitable bolts 19 or the like which construction permits the easy and ready detachment of the pitman from the trunnions 13.

From the foregoing it will readily be understood that the pitman is pivotally supported by the trunnions 13 and attention is directed to the fact that suitable bronze bushings 21 are interposed between the trunnions and the pitman yoke.

By reason of the fact that the drive is entirely enclosed in the housing A, it can run in oil or grease to eliminate wear of the moving parts. To provide access to the housing and the drive, the housing is provided with a removable cover 22.

It will be seen that when the shaft 8 is revolved through the medium of a suitable power mechanism that this shaft will rotate the wheel 9 which will in turn rotate the pitman 14 by reason of the ball connection 15 between the wheel and the pitman. As the balled end of the pitman rotates, the fork end of the pitman will turn on the hub trunnions 13 and the pitman will consequently impart a rocking motion to the shaft 10 and the distance which the shaft 10 is moved will depend upon the distance of the ball end of the pitman from the center line of the wheel 9. During the rotation of the wheel 9, the center line of the pitman will describe a motion similar to the shape of the cone with the base of the cone equal in diameter to the diameter of the circle described by the rounded end of the pitman.

Referring to Figure 3, in which appears a modified form of the invention showing another manner in which the device may be used, it will be seen that a sliding motion is imparted to racks through the medium of a rotating shaft there being interposed between the rotating shaft and the rack a second shaft to which is imparted a rocking motion.

In describing this form of the invention the universal drive is designated as an entirety by the letter B as the construction of the drive has been hereinbefore described in detail. As clearly appears the driving shaft 8 is provided with a gear wheel 25 meshing with a gear wheel 26 of an electric motor 27 or the like. The universal drive and motor are supported upon a suitable base 28 and on which is mounted a bearing 29 for the outer end of the drive shaft 8.

The rock shaft 10 is provided with extensions 30 and 31 at each side of the drive housing. The shaft portion 30 is provided with a suitable toothed quadrant 32 which engages a rack 33 which is adapted to slide in a guideway 34. A mechanism such as is described could be used in many instances where a sliding power drive or movement is desired.

The extension shaft portion 31 is provided with a double arm connection consisting of the arms 35 and 36 which extend on opposite sides of the shaft. With a connection of this character there could be imparted to a rack a sliding motion in the manner just described, through the medium of one of the arms while the other arm could be utilized for imparting purely a rocking motion by connection to some desired element.

As will clearly appear in my pending patent application Serial No. 12,001, heretofore referred to, this drive is particularly adapted for use with a rolling mill manipulator but I do not limit myself to this particular use of the invention as it can be used where ever it is desired to impart either a rocking or a sliding motion with a rotating shaft as the primary driving element.

Having thus described my invention what I claim and desire to secure by Letters Patent is:—

1. A universal joint for rolling mill manipulators and the like comprising an oscillating shaft, a revolving shaft having its inner end removed from the said oscillating shaft, the inner end of the revolving shaft provided with a circular member, a housing encircling the circular member and the periphery of the circular member having a bearing engaging the said housing, the circular member provided with an eccentric pitman bearing, a pitman having its free end in said eccentric bearing, a yoke connecting the pitman and the said oscillating shaft, the oscillating shaft provided with trunnions engaging the said yoke, whereby the parts operate as described.

2. A universal joint for rolling mill manipulators or the like comprising an oscillating shaft and a rotating shaft both shafts being horizontally disposed and at right angles to each other, said rotating shaft having its inner end removed from said oscillating shaft and carrying a circular portion provided with an eccentric bearing, said oscillating shaft having keyed thereto a hub provided with outwardly extending trunnions at right angles to the shaft, a pitman having one end journalled in the eccentric bearing of said circular portion and its other end forked and provided with a separate detachable yoked portion, and said pitman forked and yoked portion encircling and attached to the trunnions of the oscillating shaft hub, for the purpose described.

3. A universal joint for rolling mill manipulators or the like comprising an oscillating shaft, a rotating shaft extending at right angles to said oscillating shaft with its inner end removed from said oscillating shaft and provided with an eccentric bearing, a pitman having its free end journalled in said bearing, said pitman having a forked end and yoked portion, said forked end and yoked portions forming a circle, bearings in the opposite sides of the circle formed by the forked pitman end and its yoke, a hub keyed to the oscillating shaft and provided with projecting trunnions, said trunnions surounded by the bearings in the forked ends of the pitman, and said yoke removably attached to the pitman to permit the ready attachment and detachment of the pitman to the hub trunnions, for the purpose described.

4. A universal joint for rolling mill manipulators or the like comprising an oscillating shaft, a rotating shaft extending at right angles to said oscillating shaft and having its inner end removed from said oscillating shaft, said rotating shaft carrying an eccentric bearing, a pitman having its free end journalled in said bearing, a hub keyed to the oscillating shaft and provided with projecting trunnions, a pitman provided with bearings for said hub trunnions, said pitman bearings being split and a portion of them carried by a removable yoke forming a part of said pitman, and said yoke removably clamped to said pitman, for the purpose described.

In testimony whereof I hereunto affix my signature.

JOHN A. HELLSTROM.